United States Patent
Scalart et al.

(10) Patent No.: US 6,895,094 B1
(45) Date of Patent: May 17, 2005

(54) ADAPTIVE IDENTIFICATION METHOD AND DEVICE, AND ADAPTIVE ECHO CANCELLER IMPLEMENTING SUCH METHOD

(75) Inventors: Pascal Scalart, Ploubezre (FR); Franck Bouteille, Lannion (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/528,952

(22) Filed: Mar. 20, 2000

(30) Foreign Application Priority Data

Mar. 26, 1999 (FR) ............................................ 99 03822

(51) Int. Cl.$^7$ ................................................ H04B 3/20
(52) U.S. Cl. ..................... 381/66; 379/406.01; 708/322
(58) Field of Search ...................... 381/66, 71.1, 71.8, 381/71.11, 71.12, 71.13, 71.14; 379/406.01–406.16; 370/286, 289; 708/322; 375/232

(56) References Cited

U.S. PATENT DOCUMENTS

| | | | |
|---|---|---|---|
| 5,408,530 A | * 4/1995 | Makino et al. | ............. 379/392 |
| 5,428,562 A | * 6/1995 | Gay | ............................. 708/322 |
| 5,570,423 A | * 10/1996 | Walker et al. | ............. 379/410 |
| 5,734,715 A | * 3/1998 | Scalart et al. | .......... 379/406.08 |
| 6,788,785 B1 | * 9/2004 | Ding | ...................... 379/406.08 |

OTHER PUBLICATIONS

P Scalart et al., [a system for speech enhancement in the context of hands–free radiotelephony with combined noise reduction and acoustic echo cancellation], speech communication, 1996, vol. 20 No 3, pp. 203–214.*

P Scalart et al., <<A System for Speech Enhancement in the Context of Hands–Free Radiotelephony with Combined Noise Reduction and Acoustic Echo Cancellation >>, Speech Communication, 1996, vol. 20 No. 3, pp. 203–214.

* cited by examiner

Primary Examiner—Duc Nguyen
Assistant Examiner—Lun-See Lao
(74) Attorney, Agent, or Firm—Gardner Carton & Douglas LLP

(57) ABSTRACT

The device receives an input signal $x_t$ and an observation signal $y_t$, one component of which is the response of a system to the input signal. It determines an error signal $e_t$ at an instant t in accordance with the equation $e_t = y_t - X_t^T H_{t-1}$, where $H_{t-1}$ is a vector made up of L coefficients of an identification filter having a finite impulse response representative of the impulse response of the system and $X_t^T = (x_t, x_{t-1}, \ldots, x_{t-L+1})$. A predictive analysis of the input signal is performed by a computation applied to frames of the input signal. The L coefficients of the identification filter are adapted by adding to the vector $H_{t-1}$ a vector proportional to $$\frac{e_t}{X_t^T U_t + \lambda} U_t,$$

where $U_t$ is a vector made up of the L values of a prediction residue of the input signal at the instant t and at the preceding L−1 instants, and $\lambda$ is a positive or zero coefficient.

24 Claims, 4 Drawing Sheets

PRIOR ART

ADAPTIVE IDENTIFICATION METHOD AND DEVICE, AND ADAPTIVE ECHO CANCELLER IMPLEMENTING SUCH METHOD

BACKGROUND OF THE INVENTION

The present invention generally relates to adaptive identification techniques. It is particularly well suited, though not exclusively, to use with echo cancellers used in telecommunications.

Adaptive identification of linear systems characterised by their impulse response has been widely studied and numerous algorithmic solutions have been proposed in specialist literature.

The general problem of direct identification by transverse adaptive filtering, which corresponds to the majority of practical applications, is considered.

Figure 1:
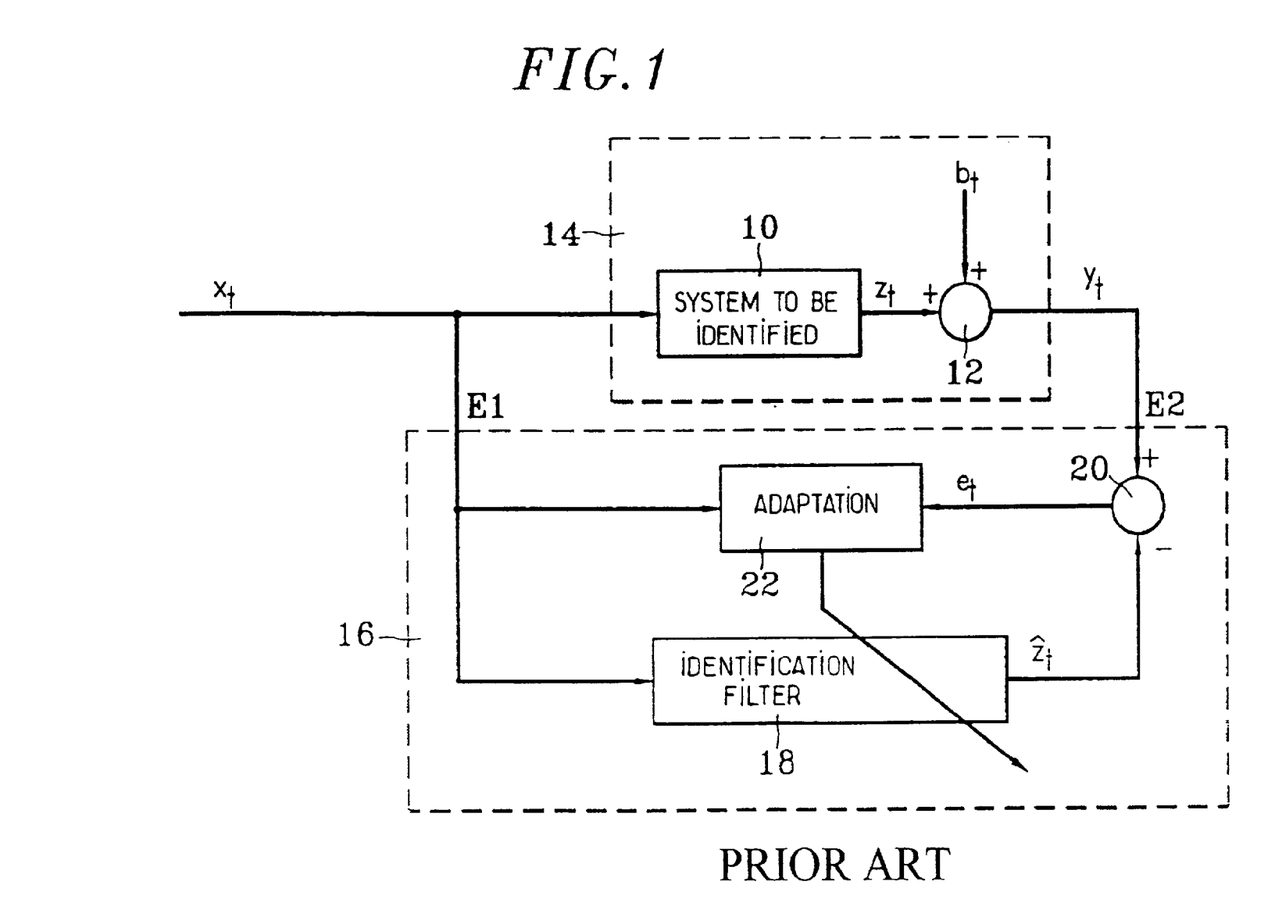
FIGS. 1 and 2, discussed above, are block diagrams of adaptive identification devices known from the prior art.

FIG. 1 illustrates a system to be identified 10, to which a signal $x_t$ varying over time is applied. The response of the system 10 to the input signal $x_t$ is written as $z_t$. Measurement of the response $z_t$ is inevitably accompanied by the addition of an interference component $b_t$ referred to as observation noise. This observation noise $b_t$ may comprise noise strictly speaking (white noise or traffic noise, for example), but also some useful signal. The component $b_t$ is referred to as observation noise because it interferes with the observation of the response $z_t$. The adder 12 in the drawing symbolises the superposition of the component $b_t$, assumed to be additive, to the response $z_t$. The measured observation signal $y_t$ is therefore the response of a real system 14 comprising the system to be identified 10 and the adder 12.

The adaptive identification device 16 receives the input signal $x_t$ on a first input E1 and the observation signal $y_t$ on a second input E2. The signals $x_t$ and $y_t$ are amplified, filtered and digitised at the input of the device 16 by conventional elements, not illustrated. The adaptive identification device 16 has an identification filter 18 consisting of a programmable filter having a finite impulse response (FIR) expressed as $$H_{t-1}^T = (h_{t-1}^0, h_{t-1}^1, \ldots, h_{t-1}^{L-1}),$$

where $(.)^T$ denotes the matrix transposition. The coefficients of the identification filter 18 are adapted so that this impulse response $H_{t-1}^T$ is representative of the impulse response of the system to be identified 10. The filter 18 receives the digitised input signal $x_t$ and supplies an estimation $\hat{z}_t$ of the response $z_t$ of the system 10.

A subtractor 20 removes this estimation $\hat{z}_t$ from the digitised observation signal $y_t$ to supply an error signal $e_t$. This error signal $e_t$ may be regarded as an estimation of the interference component $b_t$.

A updating unit 22 of the identification filter adapts the coefficients of the filter 18 on the basis of the input signal $x_t$ and the error signal $e_t$, generally taking an adaptation step $\mu$ into account.

Numerous algorithms have been proposed to automatically determine the coefficients of the adaptive filter 18. When used in practice, the originators of these devices are generally forced to seek a compromise between the convergence speed of the algorithm, the ease with which it can be controlled, and run, the arithmetic complexity and numerical stability.

The LMS algorithm (<<Least Mean Square>>) is the algorithm most widely used to adapt the impulse response of a FIR identification filter continuously over time. Such algorithm provides an efficient implementation of a Wien filter with L coefficients which minimises the mean value of the power of the filtering error in the stochastic approximation. It is defined by the equations:

$$e_t = y_t - X_t^T H_{t-1} \tag{1}$$

$$H_t = H_{t-1} + \mu e_t X_t \tag{2}$$

where $X_t = (x_t, x_{t-1}, \ldots, x_{t-L+1})^T$ represents the vector of the last L samples of the input signal and $\mu$ represents the adaptation step of the algorithm. The main advantages of this algorithm are its low numerical complexity, its ease of implementation and its robustness to errors. Unfortunately, if highly correlated signals (such as speech signals) are used to excite the unknown system, this algorithm has a convergence speed which deteriorates rapidly.

In order to get round these problems, a specific version of the LMS algorithm is often used, incorporating a parameter adjustable adaptation step.

This algorithm then corresponds to a normalised version of the LMS, or NLMS (<<Normalized Least Mean Square>>) in which the coefficients of the adaptive filter are updated according to the following equation:

$$H_t = H_{t-1} + \frac{\mu e_t}{X_t^T X_t} X_t \tag{3}$$

Assuming that the optimum filter $H^{opt}$ of the unknown system 10 is a FIR filter of an order lower than or equal to L, equation (3) may be written:

$$\Delta H_t = [I - \mu X_t (X_t^T X_t)^{-1} X_t^T] \Delta H_{t-1} - \mu X_t (X_t^T X_t)^{-1} b_t \tag{4}$$

where $\Delta H_t = H^{opt} - H_t$ represents the error in the estimated coefficients of the filter at iteration t. This expression corresponds to a geometric interpretation of the NLMS algorithm. In situations where $\mu \neq$, equation (4) corresponds to a relaxed projection of the vector $\Delta H_{t-1}$ across an affine sub-space wholly determined by the matrix between the brackets and by knowing the initial shift imparted by the last term of equation (4).

In order to come up with new algorithms offering a higher convergence speed than that of the NLMS algorithm, several approaches have been proposed in the background literature (implementation in the frequency domain, sub-band filtering, . . . ). Below, we will look at those based on modifying the direction of the projection of the NLMS as well as those based on using a whitening filter.

Improving Convergence by Modifying the Direction of Projection

Convergence of the NLMS can be improved by modifying the direction of projection as mentioned above. This analysis is the basis of affine projection algorithms (APA) which are based on a projection of multiple order equal to P. As a result, the algorithms have much better convergence properties on correlated signals in comparison with the NLMS algorithm (which corresponds to the extreme case where P=1). The P-order APA algorithms (see K. Oseki et al., <<An adaptive algorithm using an orthogonal projection to an affine subspace and its properties>>, Electronics and communications in Japan, 1984, Vol. 67-A, no 5, pages 19–27) are characterised by updating the coefficients of the identification filter 18 according to the following equations:

$$e_{t,P} = Y_{t,P} - \underline{X}_{t,P} H_{t-1} \tag{5}$$

$$H_t = H_{t-1} + \mu \underline{X}_{t,P}^{\#} e_{t,P} \tag{6}$$

where:

$$\underline{X}_{t,P}=(X_t, X_{t-1}, \ldots, X_{t-P+1})^T \quad (7)$$

$$Y_{t,P}=(y_t, y_{t-1}, \ldots, y_{t-P+1})^T \quad (8)$$

in which $e_{t,P}$ denotes the a priori error vector and $\underline{X}_{t,P}^{\#}=\underline{X}_{t,P}^T(\underline{X}_{t,P}\underline{X}_{t,P}^T)^{-1}$ represents the generalised inverse Moore-Penrose matrix of order L×P. With these equations for updating coefficients of the identification filter, it can be shown that the estimated a posteriori error vector $e_{t,P}^{post}$ is equal to:

$$e_{t,P}^{post}=Y_{t,P}-\underline{X}_{t,P}H_t=(1-\mu)e_{t,P} \quad (9)$$

Assuming that the adaptation step of the algorithm is equal to unity, the P order affine projection algorithm cancels out the P a posteriori errors defined at equation (9). This latter property explains why the convergence behaviour of the algorithm is very good. Unfortunately, in the basic version described by equations (5) and (6), the theoretical complexity of such algorithms is in the order of $2LP+K_{inv}P^2$ where $K_{inv}$ represents a constant associated with the computation of the inverse matrix incorporated in equation (6), where the parameters L and P denote respectively the number of coefficients of the identification filter and the projection order.

In order to reduce this initial complexity, several fast versions of these algorithms have been proposed which involve segmenting the pseudo-autocorrelation matrix in a manner similar to the fast recursive least squares algorithms. Such techniques enable the initial complexity to be reduced to more reasonable values in the order of 2L+20P (see: Steven L. Gay, <<A fast converging, low complexity adaptive filtering algorithm>>, Proceedings of the 3$^{rd}$ International Workshop on Acoustic Echo and Noise Control, Plestin-Les-Grèves, France 1993, pages 223–226; Steven L. Gay, <<Fast projection algorithms with application to voice echo cancellation>>, Ph.D. Dissertation of the State University of New Jersey, USA, 1994; Steven L. Gay et al., <<The fast affine projection algorithm>>, Proceedings of ICASSP'95, pages 3023–3026, 1995; M. Montazéri, <<Une famille d'algorithmes adaptatifs comprenant les algorithmes NLMS et RLS: application à l'annulation d'écho acoustique>>, Thèse de Doctorat de l'Université de Paris Sud, 1994; M. Tanaka et al., <<Reduction of computation for high-order projection algorithm>>, Electronics Information Communication Society Autumn Seminar, Tokyo, 1993).

Improving Convergence with a Whitening Filter

Figure 2:
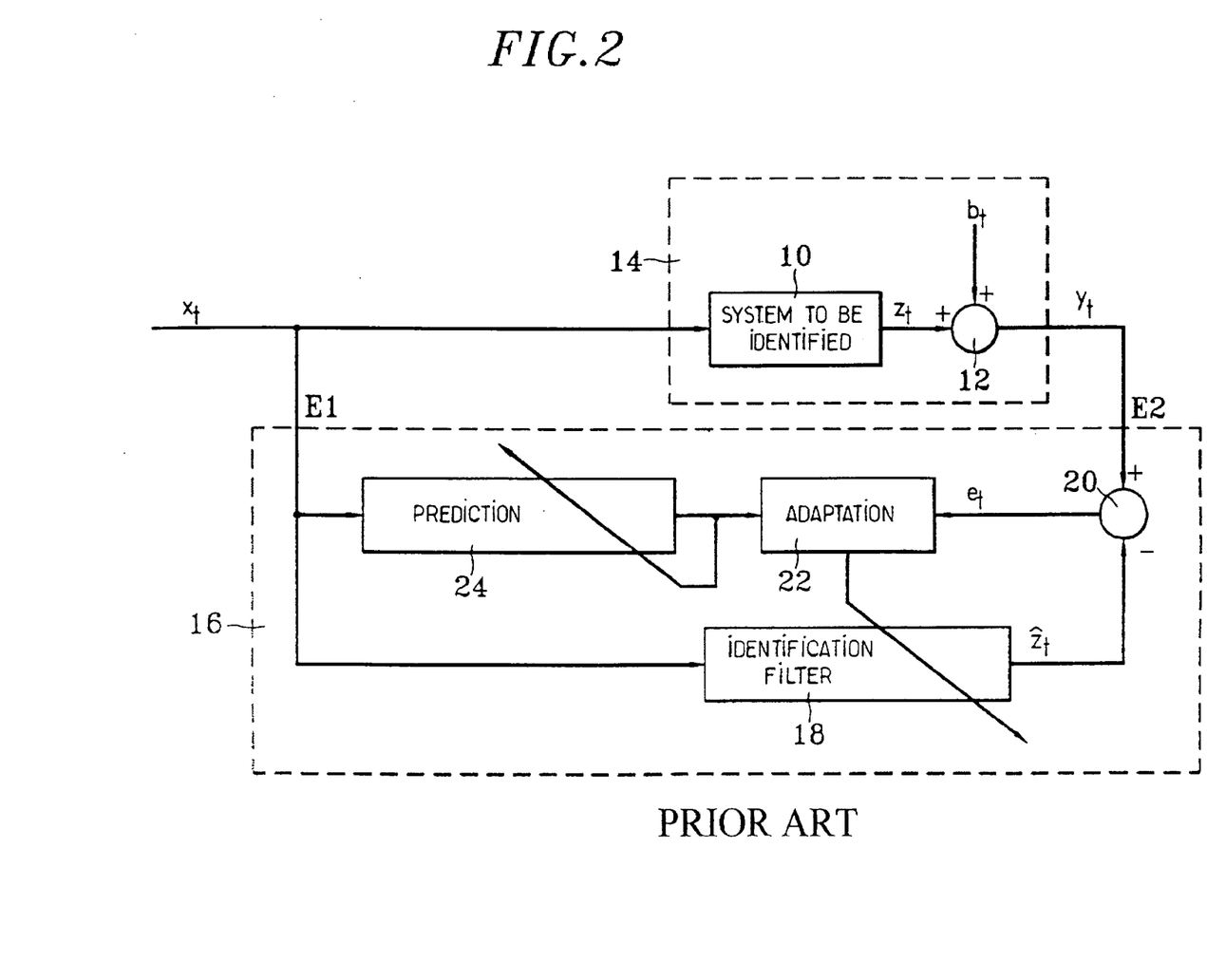

Numerous research papers have been devoted to studying ways of improving the performance of adaptive identification systems using predictive structures (see: M. Mboup et al., <<LMS coupled adaptive prediction and system identification: a statistical model and transient analysis>>, IEEE Transactions on signal processing, Vol. 42, no 10, October 1994, pages 2607–2615; S. Benjebara, <<Caractéristiques des signaux et capacité de poursuite des non-stationnarités aléatoires: apport des schémas prédictifs et multirésolutions>>, Thèse de l'Université des Sciences, des Techniques et de Médecine de Tunis II, Tunis, 1997). Case studies have been able to demonstrate two main structures (symmetrical or non-symmetrical) for pre-whitening the excitation signal of the filter using an adaptive filtering technique. The general principle as to how the non-symmetrical structure is processed is illustrated in FIG. 2.

A structure of this type is essentially based on an empirical approach intended to modify the signal used to update coefficients of the adaptive filter and transform it so as to reduce the conditioning of its auto-correlation matrix (ratio between the maximum and minimum eigenvalues of the auto-correlation matrix of this signal). As a result, coefficients are updated by the adaptation module 22 using the signal available at the output of a linear prediction circuit 24, whereby the prediction is performed from M coefficients. The algorithm applied by the module 22 to update the L coefficients of the identification filter 18 corresponds to the LMS (equation (2)) or to the NLMS (equation (3)). Similarly, the prediction circuit 24 is implemented as an adaptive filter with M coefficients which are updated with the aid of an LMS algorithm.

Studies devoted to analysing the performance obtained from this type of structure have specifically highlighted the existence of a very strong interaction between the prediction and adaptation modules of the system. In particular, this leads to an inter-dependence between the coefficient adaptation equations of the adaptive predictor 24 and those of the identification filter 18. This strong dependence also occurs in the choice of the two adaptation steps $\mu_P$ and $\mu_H$, which creates a zone of very low stability of the entire structure.

As a result, the authors mention an instability of the entire predictive structure identification system, which limits the prediction orders used in the implementations to values which are always less than four so as to ensure a relative stability, thereby limiting the identification performance: it is necessary to select very low adaptation steps $\mu_P$ and $\mu_H$ which are not compatible with the aim of improving convergence speed.

Reviewing the solutions proposed in the literature to improve the convergence speed of adaptive identification algorithms leads to the conclusion that on the one hand the algorithms based on modifying the projection direction remain complex in terms of the number of arithmetical operations needed to update the filter coefficients if the projection order P is high and that, on the other hand, the predictive structure identification schemes remain very delicate in terms of control and offer a reduced gain in convergence because of the low prediction orders M used in practice to ensure that the global structure remains relatively stable.

An object of the present invention is to propose a method of adaptive identification which has good convergence properties and which is relatively simple to implement, with a limited arithmetic complexity.

SUMMARY OF THE INVENTION

Accordingly, the invention proposes a An adaptive identification method for estimating the response of a system to an input signal, comprising the steps of: receiving the input signal on the one hand and on the other an observation signal, one component of which is said response to the input signal; determining an error signal $e_t$ at an instant t in accordance with the expression $e_t=y_t-X_t^T H_{t-1}$, where $y_t$ denotes the value of the observation signal at the instant t, $H_{t-1}$ is a column vector made up of L coefficients of a identification filter (18) having a finite impulse response representative of the impulse response of the system, and $X_t^T=(x_t, x_{t-1}, \ldots, x_{t-L+1})$ is a row vector made up of the values $x_t, x_{t-1}, \ldots, x_{t-L+1}$ of the input signal at the instant t and at the preceding L-1 instants; and adapting the L coefficients of the identification filter by taking account of the input signal and the error signal. According to the invention, prediction parameters of the input signal are obtained, whereby the energy of a prediction residue on successive frames of the input signal is minimised, and the L coefficients of the identification filter are adapted by adding to the column vector $H_{t-1}$ a column vector proportional to $$\frac{e_t}{X_t^T U_t + \lambda} U_t,$$

where $U_t$ is a column vector made up of the L values of the prediction residue of the input signal at the instant t and at the preceding L−1 instants, and $\lambda$ is a positive or zero coefficient.

In the preferred modes of applying the method:
the frames of the input signal have a duration of at least 5 ms;
the frames of the input signal have mutual overlaps;
the input signal is analysed by a linear prediction of order P−1, preferably being equal to 5 or more, and the column vector $U_t$ is given by $$U_t = X_t + \sum_{q=1}^{P-1} a_q X_{t-q},$$

in which the terms $a_q$ denote the linear prediction coefficients of said analysis. The order P−1 of the linear prediction may also be a function of an estimated stationarity of the input signal;
the input signal is a speech signal reconstituted by a decoder from an incoming binary stream and the prediction parameters of the input signal are extracted from the incoming binary stream by the decoder, which may also supply the prediction residue for adapting the L coefficients of the identification filter.

Another aspect of the invention relates to an adaptive identification device for a system to which an input signal is applied comprising: a first input receiving the input signal; a second input receiving an observation signal, one component of which is a response of the system to the input signal; an identification filter with a finite impulse response of the system; a subtractor producing an error signal $e_t$ expressed by equation (1) above; means for obtaining prediction parameters from the input signal, whereby the energy of a prediction residue on successive frames of the input signal is minimised; and adaptation means updating the L coefficients of the identification filter by adding to the column vector $H_{t-1}$ a column vector proportional to $$\frac{e_t}{X_t^T U_t + \lambda} U_t.$$

Another aspect of the invention relates to an adaptive echo canceller for removing the echo components of a direct signal from a return signal, comprising an identification device of the type mentioned above, the first input of which receives the direct signal as the input signal and the second input of which receives the return signal as the observation signal, the error signal constituting the output signal of the echo canceller.

DESCRIPTION OF PREFERRED EMBODIMENTS

In the case of stationary signals, the following equation can be established between the linear prediction coefficients $a_1, \ldots, a_{P-1}$ of order P−1 of the input signal $x_t$ and the inverse $R_{t,P}^{-1}$ of the auto-correlation matrix $R_{t,P} = \underline{X}_{t,P} \underline{X}_{t,P}^T$ of the signal (the matrix $\underline{X}_{t,P}$ being defined by equation (7)):

$$\begin{pmatrix} 1 \\ a_1 \\ \vdots \\ a_{P-1} \end{pmatrix} = R_{t,P}^{-1} \begin{pmatrix} X_t^T U_t \\ 0 \\ \vdots \\ 0 \end{pmatrix} \qquad (10)$$

where: $U_t = X_t + \sum_{q=1}^{P-1} a_q X_{t-q}$ (11)

Assuming that the APA algorithm or order P defined above has an adaptation step of $\mu=1$, cancellation of the errors a posteriori (equation (9)) simplifies the a priori error vector (5): $e_{t,P}=(e_t, 0, \ldots, 0)^T$, so that the adaptation formula (6) of the identification filter becomes, taking account of equation (10):

$$H_t = H_{t-1} + \frac{e_t}{X_t^T U_t} U_t \qquad (12)$$

On this basis, a variant of the APA algorithm of order P can be defined, referred to hereafter as the <<pseudo-APA algorithm of order P>>, wherein an adaptation step $\mu$ is re-introduced and optionally a positive regularisation constant $\lambda$. The error signal in the pseudo-APA algorithm is defined by equation (1) and the identification filter is updated according to:

$$H_t = H_{t-1} + \frac{\mu e_t}{X_t^T U_t + \lambda} U_t \qquad (13)$$

The adaptation step $\mu$ is typically between 0.1 and 1, and $\lambda \geq 0$. Compared with the prediction-based identification structure described above, the pseudo-APA algorithm of order P has two major differences:
the prediction coefficients $a_q$ are no longer evaluated at the rate of the samples but at a rate of blocks. They correspond to the minimisation of the linear prediction energy on frames having a size of N samples. Efficient implementation techniques can be used to estimate the set $\{a_q; q=1, \ldots, P-1\}$ of coefficients of the predictor filter.
equation (13) used to update coefficients of the identification filter $H_{t-1}$ does not correspond to that used in the studies previously carried out. Indeed, those studies rely on an empirical approach aimed at whitening the excitation signal in order to improve the convergence speed of the modes, this being proportional to the conditioning of the auto-correlation matrix of the excitation signal. As a result, the LMS or NLMS algorithms proposed by the authors as a means of updating coefficients of the identification filter (and also of the predictor) do not correspond to that of equation (13). These algorithms differ due to the normalisation term contained in the equation used to update the filter coefficients, the term expressed as $(U_t^T U_t)^{-1}$ in the LMS being replaced in equation (13) by a composite term $(X_t^T U_t)^{-1}$ or $(X_t^T U_t + \lambda)^{-1}$.

The method proposed by the invention resolves the problem frequently caused by the strong correlation of the signals to be processed. Indeed, in the latter case, the conventional algorithms tend to lose their good convergence properties. The method proposed by the invention enables these good convergence properties to be intrinsically conserved, even in the presence of highly correlated signals, which frequently occur in practice. It also enables a limited arithmetic complexity to be conserved, which is a major advantage for the real time implementation of these identification algorithms with digital signal processors.

The pseudo-APA algorithm forms the basis of a new family of adaptive identification devices which can be used in various application fields (echo cancellation, propagation channel equalisation, automatic process control, etc.). The case of acoustic echo cancellation will be discussed below by way of non-limiting example.

Figure 3:
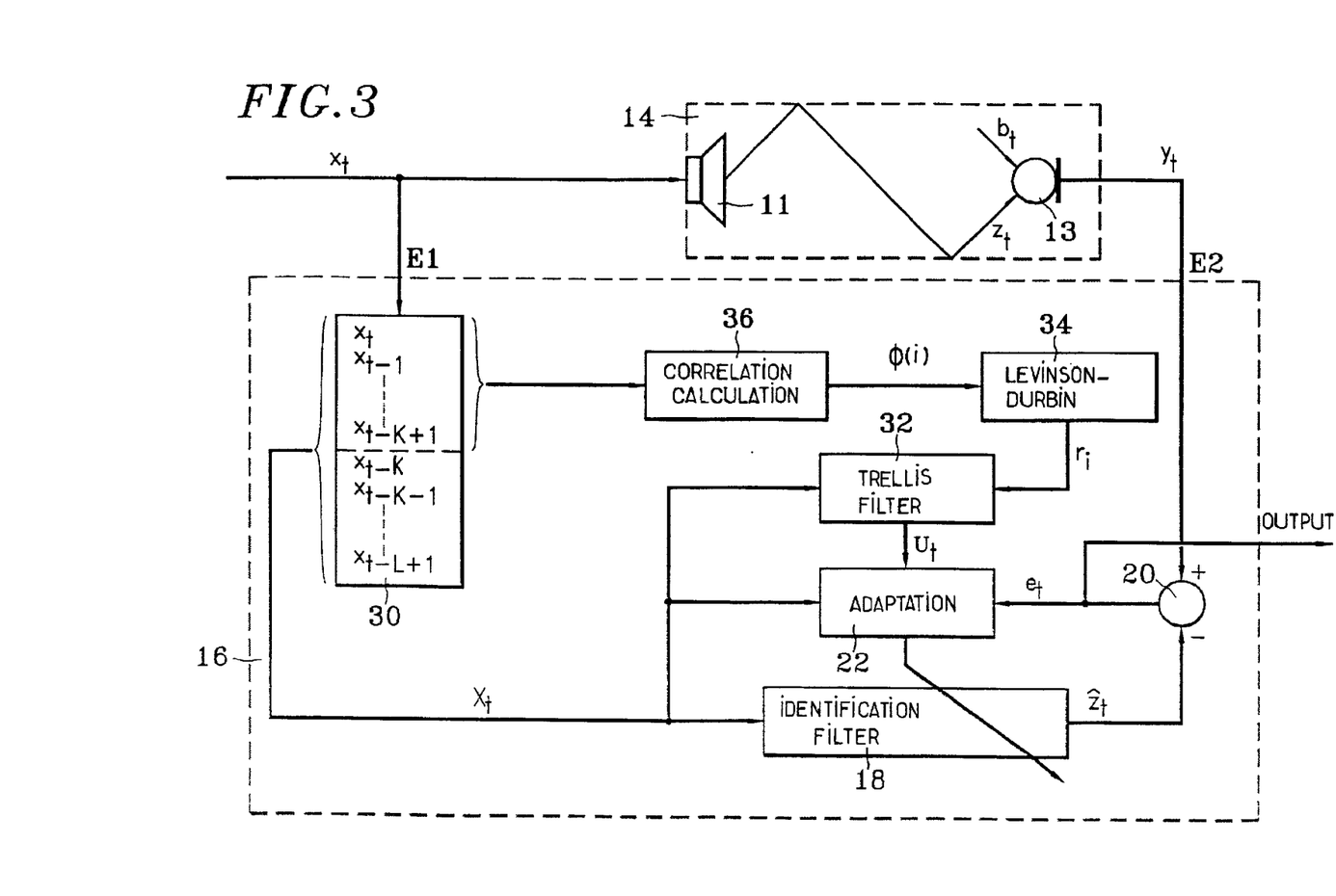
FIG. 3 is a block diagram of an echo canceller incorporating an adaptive identification device as proposed by the invention.

FIG. 3 illustrates an adaptive echo canceller incorporating an adaptive identification device 16 proposed by the invention. The echo canceller is associated with a hands-free telephone system. The input signal $x_t$, received on the input E1 of the device, is the direct signal destined for the loudspeaker 11 of the hands-free system. The observation signal $y_t$ received on the input E2 of the device is the return signal picked up by the microphone 13 of the hands-free system. This observation signal $y_t$ incorporates echo components $z_t$ from the direct signal and interference components $b_t$ which might include noise and the speech emitted by the speaker. This being the case, the system to be identified consists of the echo path or paths between the loudspeaker 11 and the microphone 13.

The output signal from the echo canceller is the error signal $e_t$ supplied by the subtractor 20 from the observation signal $y_t$ and the echo estimation $\hat{z}_t$ produced by the identification filter 18.

The time windows of the input signal $x_t$ are managed by a module 30 which stores at least the last L samples $x_t, x_{t-1}, \ldots, x_{t-L+1}$. These L samples, which form the vector $X_t$, are applied: (i) to the identification filter 18 which performs the filtering according to the last term of equation (1); (ii) to the adaptation module 22 which updates the coefficients of the filter 18 in accordance with equation (13); and (iii) to the prediction filter 32 which applies to the adaptation module 22 the vector $U_t$ defined by equation (11), made up of the last L values of the prediction residue.

At each instant t, the filter 32 merely has to produce the first component of the vector $U_t$, i.e. the current value of the residue equal to $$x_t + \sum_{q=1}^{P-1} a_q x_{t-q},$$

the other components having been calculated and stored on reception of the preceding samples.

In the example illustrated in FIG. 3, the prediction filter 32 has a conventional trellis structure, the prediction coefficients $a_q$ ($1 \leq q < P$) being represented by the P–1 associated reflection coefficients $r_1, \ldots, r_{P-1}$. The reflection coefficients $r_i$ are obtained by a module 34, for example, in accordance with the well-known Levinson-Durbin algorithm based on the autocorrelations $\phi(i)$ of the input signal calculated by a module 36. The Levinson-Durbin algorithm run by the module 34 may be expressed as follows:

$$E(0) = \phi(0)$$

For $i$ ranging from 1 to $P-1$, do:

$$r_i = \left[ \phi(i) + \sum_{j=1}^{i-1} a_j^{i-1} \cdot \phi(i-j) \right] \bigg/ E(i-1)$$

$$a_i^i = -r_i$$

$$E(i) = (1 - r_i^2) \cdot E(i-1)$$

For $j$ ranging from 1 to $i-1$, do:

$$a_j^i = a_j^{i-1} - r_i \cdot a_{i-j}^{i-1}$$

End For

End For

The reflection coefficients $r_i$ applied to the filter 32 are those obtained after iteration P–1, as well as the coefficients $a_q$ of equation (11) ($a_q = a_q^{P-1}$) The quantity E(P–1) is the energy of the residual prediction error.

The correlation coefficients $\phi(i)$ are calculated by the module 36 as follows $$\phi(i) = \sum_{j=0}^{N-1} \tilde{x}(j) \cdot \tilde{x}(j-i) \qquad (14)$$

where $\tilde{x}(j) = x_{t-j} \cdot f(j)$ represents the input signal multiplied by a conventional windowing function such as a rectangular, Hamming or other function.

The calculation of the correlations $\phi(i)$ and the Levinson-Durbin algorithm, which is equivalent to a minimisation of the prediction energy E(P–1), are executed on frames of N samples of the input signal, N being a number of the same order of magnitude as the length L of the impulse response of the identification filter 18.

By way of example, if the signals are sampled at a frequency Fe=8 kHz, the filter 18 may have L=256 coefficients and the size of the frames may be N=160, i.e. the frames are 20 ms long. In a telephony application, it can be assumed that over such a duration the speech signals are almost stationary, which validates one of the assumptions made in deriving the pseudo-APA algorithm from the APA algorithm. In general, this frame duration may be longer than 5 ms.

The frames of the input signal processed by the predictive analysis modules 34, 36 preferably overlap, which will enable the non-stationary aspect of the signal to be taken into account. The predictive analysis is then performed every K samples of the input signal where K<N. By way of example, the duration of overlap between two successive frames may be in the order of 15 ms. In the case of the numerical example above, this corresponds to K=40, each frame being made up of four successive blocks.

If N is a multiple of K, this will further simplify calculation of the correlation coefficients by module 36. After receiving each block of K values of the input signal $x_t$, it will be sufficient to calculate a partial correlation for each i corresponding to the K most recent terms of equation (14) and to update the correlations $\phi(i)$ by adding to them the partial correlations just calculated and removing from them the partial correlations calculated N/K blocks before.

It should be pointed out that other techniques may be used to implement the prediction filter. For example, a method other than the Levinson-Durbin algorithm may be used to calculate the reflection coefficients $r_i$ or a different structure for the prediction filter based on the reflection coefficients $r_i$. It is also possible to use another known structure of the prediction filter based directly on the prediction coefficients $a_q$, or on the LAR coefficients (<<Log-Area-Ratio>>, $LAR_i = \log_{10}[(1-r_i)/(1+r_i)])$, or alternatively on the LSP coefficients (<<Line Spectrum Pair>>), . . . .

The device proposed by the invention offers the possibility of varying the order P−1 of the prediction as a function of the instantaneous characteristics of the input signal. In particular, the stationarity of the signal $x_t$ may be evaluated, for example by analysing the correlation or partial correlation coefficients calculated by the module 36 in order to adopt a relatively high prediction order P−1 if the input signal tends towards being stationary and a lower prediction order in the presence of non-stationarities.

It is possible to evaluate the arithmetic complexity of the pseudo-APA algorithm. The relevant characteristics are set out in Table I, where they are compared with those of the exact NLMS and APA algorithms of order P, in a configuration which is typical of echo cancellation. In the table, P denotes the maximum order of the pseudo-APA algorithm which the circuit 16 can implement and P′ the order effectively used in the comparative example.

TABLE I

| | NLMS | exact APA | Pseudo-APA |
|---|---|---|---|
| Theoretical complexity per sample (number of elementary operations) | 3 L | 2 LP + $K_{inv}$ | $P^2$ Max{3 L, $^3/_2 P$ + (P′ + 5).P′} |
| Complexity/sample with the configuration:<br>Fe = 8 kHz<br>L = 256 coefficients<br>N = 160 (20 ms)<br>P′ = P − 1 = 8 | 768 op.<br>6,14 Mflops | >4096 op.<br>>32,7 Mflops | 824 op.<br>6,6 Mflops |

It is noted that the arithmetic complexity of the pseudo-APA algorithm is essentially equivalent to that of the NLMS in the case of an identification filter having L=256 coefficients and for a prediction filter whose coefficients are evaluated every 5 ms on 20 ms frames (K=40, N=160). Accordingly, the invention proposes algorithms approaching the performance of high-order affine projection algorithms (typically higher than 4) for a complexity lower than that of the exact affine projection algorithm of order 2.

In terms of hardware, the identification device 16 may be set up from commercial circuits, in particular from real time digital signal processors (DSP) with floating point arithmetic commonly used (e.g. TMS320C3X and TMS320C4X sold by the company Texas Instruments, AD21061 sold by the company Analog Devices . . . ). Fixed point arithmetic processors may also be used, the usual precautions being taken with regard to the appropriate framing of the data in the processing.

Figure 4:
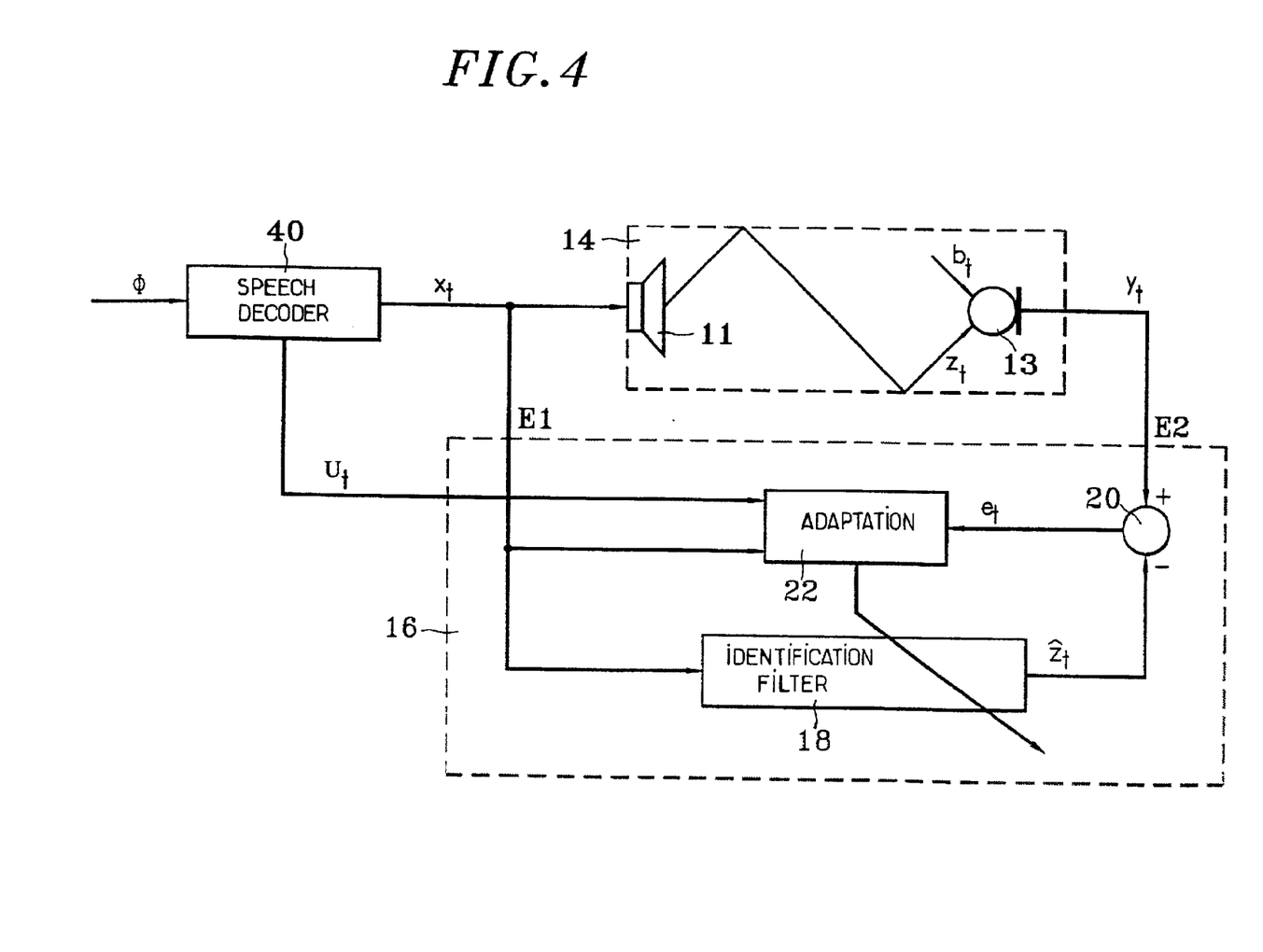
FIG. 4 is a block diagram of another embodiment of an echo canceller as proposed by the invention.

In the alternative embodiment diagrammatically shown in FIG. 4, the input signal $x_t$ is a speech signal reconstructed by a decoder 40 from an incoming binary stream Φ. The binary stream Φ was produced by a coder dual to the decoder 40, disposed in the communication network or in the terminal used by the remote speaker.

By way of example, the coder/decoder may correspond to the RPE-LTP codec used in the GSM cellular radio telephony system (see Specification GSM 06.01 issued by the European Telecommunications Standard Institute). This coder, like most digital audio coders currently used, operates on the basis of linear prediction on frames of the speech signal corresponding to an almost stationary zone of the signal, which will fulfil the requirements of this invention. In the case of GSM, the frames are 20 ms. In the binary stream Φ which it issues, the coder incorporates on the one hand quantification parameters for the LAR coefficients mentioned above, which characterise the 10-order linear prediction filter of the speech signal, and, on the other, quantification parameters of an excitation signal corresponding to the linear prediction residue.

The decoder 40 has circuits which recover the excitation signal from its quantification parameters read in the stream Φ and a synthesis filter which is the inverse of the 10-order prediction filter to which the coefficients derived by the quantified LAR's are applied. The synthesis filter receives the excitation signal and issues the decoded speech signal $x_t$. The decoder 40 can therefore obtain the linear prediction parameters from the stream Φ instead of modules 34 and 36 of the device illustrated in FIG. 3. It may also provide the prediction residue (corresponding to the excitation signal of the synthesis filter) forming the components of the vector $U_t$ needed for the adaptation module 22.

In an equipment incorporating a speech decoder and an adaptive echo canceller, it may be seen that using the pseudo-APA algorithm as illustrated in FIG. 4 does not introduce any additional complexity as compared with the NLMS, regardless of the order P.

We claim:

1. An adaptive identification method for estimating a response of a system to an input signal, comprising the steps of:

receiving the input signal and an observation signal, whereby the observation signal has a component consisting of said response to the input signal;

determining an error signal $e_t$ at an instant t according to: $e_t = y_t - X_t^T H_{t-1}$, where $y_t$ denotes a value of the observation signal at the instant t, $H_{t-1}$ is a column vector made up of L coefficients of a identification filter having a finite impulse response representative of an impulse response of the system, and $X_t^T = (x_t, x_{t-1}, \ldots, x_{t-L+1})$ is a row vector made up of values $x_t, x_{t-1}, \ldots, x_{t-L+1}$ of the input signal at the instant t and at L−1 preceding instants;

obtaining prediction parameters of the input signal, whereby an energy of a prediction residue on successive frames of the input signal is minimised; and adapting the L coefficients of the identification filter by adding to the column vector $H_{t-1}$ a column vector proportional to $$\frac{e_t}{X_t^T U_t + \lambda} U_t,$$

where $U_t$ is a column vector made up of L values of the prediction residue of the input signal at the instant t and at the L−1 preceding instants, and λ is a positive or zero coefficient.

2. A method as claimed in claim 1, wherein said frames of the input signal have a duration of at least 5 milliseconds.

3. A method as claimed in claim 1, wherein said frames of the input signal have mutual overlaps.

4. A method as claimed in claim 1, comprising the step of analysing the input signal by a linear prediction of order P−1, and wherein the column vector $U_t$ is given by $$U_t = X_t + \sum_{q=1}^{P-1} a_q X_{t-q},$$

where the terms $a_q$ denote linear prediction coefficients resulting from said analysis.

5. A method as claimed in claim 4, wherein the order P−1 of the linear prediction is at least 5.

6. A method as claimed in claim 4, wherein the order P−1 of the linear prediction is a function of an estimated stationarity of the input signal.

7. A method as claimed in claim 1, wherein the input signal is a speech signal reconstituted by a decoder from an incoming binary stream and wherein the prediction parameters of the input signal are extracted from the incoming binary stream by the decoder.

8. A method as claimed in claim 7, wherein the decoder supplies the prediction residue used to adapt the L coefficients of the identification filter.

9. An adaptive identification device for a system to which an input signal is applied, comprising:

a first input for receiving the input signal;

a second input for receiving an observation signal having a component consisting of a response of the system to the input signal;

an identification filter having a finite impulse response representative of an impulse response of the system;

a subtractor producing an error signal by subtracting from the observation signal the input signal filtered by the identification filter, wherein the error signal $e_t$ produced by the subtractor at an instant t is expressed as $e_t = y_t - X_t^T H_{t-1}$, where $y_t$ denotes a value of the observation signal at the instant t, $H_{t-1}$ is a column vector made up of L coefficients of the identification filter, and $X_t^T = (x_t, x_{t-1}, \ldots, x_{t-L+1})$ is a row vector made up of the values $x_t, x_{t-1}, \ldots, x_{t-L+1}$ of the input signal at the instant t and at L−1 preceding instants;

means for obtaining prediction parameters from the input signal, whereby the energy of a prediction residue on successive frames of the input signal is minimised;

means for adapting the coefficients of the identification filter by adding to the column vector $H_{t-1}$ a column vector proportional to $$\frac{e_t}{X_t^T U_t + \lambda} U_t,$$

where $U_t$ is a column vector made up of the L values of the prediction residue of the input signal at the instant t and at the L−1 preceding instants, and $\lambda$ is a positive or zero coefficient.

10. A device as claimed in claim 9, wherein said frames of the input signal have a duration of at least 5 milliseconds.

11. A device as claimed in claim 9, wherein said frames of the input signal have mutual overlaps.

12. A device as claimed in claim 9, wherein the means for obtaining the prediction parameters of the input signal comprise means for analysing the input signal by a linear prediction of order P−1, and wherein the column vector $U_t$ is given by $$U_t = X_t + \sum_{q=1}^{P-1} a_q X_{t-q}$$

where the terms $a_q$ are linear prediction coefficients produced by the analysis means.

13. A device as claimed in claim 12, wherein the order P−1 of the linear prediction is at least 5.

14. A device as claimed in claim 12, wherein the order P−1 of the linear prediction is a function of an estimated stationarity of the input signal.

15. A device as claimed in claim 9, wherein the input signal is a speech signal reconstituted by a decoder from an incoming binary stream, and wherein the prediction parameters of the input signal are extracted from the incoming binary stream by the decoder.

16. A device as claimed in claim 15, wherein the decoder provides the prediction residue to the means for adapting the coefficients of the identification filter.

17. An adaptive echo canceller for removing echo components of a direct signal from a return signal, comprising:

a first input for receiving the direct signal;

a second input for receiving the return signal;

an identification filter having a finite impulse response representative of an echo component generation in the return signal;

a subtractor producing an error signal as an output signal of the echo canceller, by subtracting from the return signal the direct signal filtered by the identification filter, wherein the error signal $e_t$ produced by the subtractor at an instant t is expressed as $e_t = y_t - X_t^T H_{t-1}$, where $y_t$ denotes a value of the return signal at the instant t, $H_{t-1}$ is a column vector made up of L coefficients of the identification filter, and $X_t^T = (x_t, x_{t-1}, \ldots, x_{t-L+1})$ is a row vector made up of the values $x_t, x_{t-1}, \ldots, x_{t-L+1}$ of the direct signal at the instant t and at L−1 preceding instants;

means for obtaining prediction parameters from the direct signal, whereby the energy of a prediction residue on successive frames of the direct signal is minimised;

means for adapting the coefficients of the identification filter by adding to the column vector $H_{t-1}$ a column vector proportional to $$\frac{e_t}{X_t^T U_t + \lambda} U_t,$$

where $U_t$ is a column vector made up of the L values of the prediction residue of the direct signal at the instant t and at the L−1 preceding instants, and $\lambda$ is a positive or zero coefficient.

18. An adaptive echo canceller as claimed in claim 17, wherein said frames of the direct signal have a duration of at least 5 milliseconds.

19. An adaptive echo canceller as claimed in claim 17, wherein said frames of the direct signal have mutual overlaps.

20. An adaptive echo canceller as claimed in claim 17, wherein the means for obtaining the prediction parameters of the direct signal comprise means for analysing the direct signal by a linear prediction of order P−1, and wherein the column vector $U_t$ is given by $$U_t = X_t + \sum_{q=1}^{P-1} a_q X_{t-q},$$

where the terms $a_q$ are linear prediction coefficients produced by the analysis means.

21. An adaptive echo canceller as claimed in claim 20, wherein the order P−1 of the linear prediction is at least 5.

22. An adaptive echo canceller as claimed in claim 20, wherein the order P−1 of the linear prediction is a function of an estimated stationarity of the direct signal.

23. An adaptive echo canceller as claimed in claim 17, wherein the direct signal is a speech signal reconstituted by a decoder from an incoming binary stream, and wherein the prediction parameters of the direct signal are extracted from the incoming binary stream by the decoder.

24. An adaptive echo canceller as claimed in claim 23, wherein the decoder provides the prediction residue to the means for adapting the coefficients of the identification filter.

* * * * *

UNITED STATES PATENT AND TRADEMARK OFFICE
CERTIFICATE OF CORRECTION

PATENT NO. : 6,895,094 B1
DATED : May 17, 2005
INVENTOR(S) : Pascal Scalart et al.

It is certified that error appears in the above-identified patent and that said Letters Patent is hereby corrected as shown below:

Column 10,
Line 38, change "$e_t = y_t - X_t^T H_t$." to -- $e_t = y_t - X_t^T H_{t-1}$ --.

Signed and Sealed this

Ninth Day of August, 2005

JON W. DUDAS
*Director of the United States Patent and Trademark Office*